United States Patent Office 2,929,693
Patented Mar. 22, 1960

2,929,693

METHOD OF DENSIFYING AND PELLETIZING ALKALINE EARTH METAL SILICATES

George H. Atkinson, Akron, Ohio, assignor to Columbia-Southern Chemical Corporation, a corporation of Delaware No Drawing. Application December 5, 1955
Serial No. 550,806

4 Claims. (Cl. 23—313)

The present invention deals with pellets of finely divided, amorphous alkaline earth metal silicates such as calcium silicate.

Finely divided, amorphous alkaline earth metal silicates such as calcium silicate are widely used for reenforcing rubber, pigmenting paper, formulating agricultural chemicals as solid compositions, etc. As prepared, these alkaline earth metal silicates are soft and powdery and are of low bulk density. Low bulk density materials have the disadvantage of increased freight costs based upon volume. Powdery materials raise dust problems, and their use therefore frequently includes special precautions.

According to the present invention, pellets of finely divided, amorphous alkaline earth metal silicates such as calcium silicate of high bulk density are provided. By virtue of their pelletized form dust problems encountered in handling powdery materials are obviated. Substantial freight economies accrue due to the high bulk density of the product.

Now it has been discovered that powdery, soft, pulverulent, finely divided, amorphous alkaline earth metal silicates such as calcium silicate of low bulk density, i.e. up to about 14 or 15 pounds per cubic foot, may be converted into substantially denser pellets. Bulk densities of the product range up to twice that of the original alkaline earth metal silicate.

Densification and pelletization are accomplished according to the principles of the present invention by initially charging a container with powdery, finely divided, amorphous alkaline earth metal silicates of from 20 to 70 square meters per gram area in a quantity sufficient initially to occupy at least about 50 percent of the container's volume, and less than the entire volume, e.g. to occupy up to 90 percent of the volume. By imparting a motion to the container whereby a tumbling effect on the contents is realized, pellets are formed. With cylindrical containers, rotation along the longitudinal axis thereof when horizontally disposed provides suitable tumbling action. Other motions which give a tumbling effect such as rocking or gentle shaking are useful.

Critical is the portion of the total volume of the treatment zone occupied by the initial charge. To realize both densification and pelletization, the initial charge must occupy a minimum of about half of but not the total volume of the container. Usually not more than about 90 percent of the volume should be occupied. Exceptionally good results are realized by initially filling the container to the extent that from 50 to 75 percent of its volume is occupied by the unpelletized, powdery alkaline earth metal silicate.

It has further been discovered that only certain alkaline earth metal silicates are densified and pelletized by this process. Alkaline earth metal silicates which are both pelletized and densified are finely divided, powdery, amorphous and have surface areas ranging from 20 to 70 square meters per gram as measured by the Brunauer-Emmet-Teller gas absorption method. These alkaline earth metal silicates are comprised of microscopically fine ultimate particles below one micron in size, usually ranging in size from 0.04 to 0.08 micron. Under high magnification (as under the electron microscope) these alkaline earth metal silicates appear in the form of flocs, resembling clusters of grapes, with the individual components of the flocs being the finely divided ultimate particle of the alkaline earth metal silicate.

Two types of water are found in these alkaline earth metal silicates, e.g. "free water" and "bound water." "Free water" denotes water which may be removed by heating at 105° C. for up to 25 hours. "Bound water" means the water driven off from the silicate by heating at ignition temperature, e.g. 1000° C. to 1200° C. until no further water can be removed less the "free water." Thus it appears that "bound water" is chemically united to the pigment in some way not understood clearly. Apparently, "free water" is simply absorbed on the pigment, being quite readily removed.

The "free water" content of the alkaline earth metal silicates is from about 2 to 8 percent by weight; "bound water" present normally is between 2 to 10 percent by weight.

The contemplated alkaline earth metal silicates may be represented by the structural formula $MO(SiO_2)x$ wherein $x$ ranges upwards of 1 (including fractional numbers), and is preferably from 2 to 5 in value. Calcium silicate is the most used of the alkaline earth metal silicates. Powdery, finely divided, amorphous calcium silicates ranging from 25 to 55 square meters per gram in surface area and comprised of ultimate particles ranging from 0.01 to 0.3 micron in size are strikingly densified and pelletized.

The bulk density of the herein treated alkaline earth metal silicates normally ranges from 9 to 14 pounds per cubic foot.

Such alkaline earth metal silicates are prepared by a variety of procedures such as by intermingling sodium silicate and calcium chloride or other alkaline earth metal chloride solution under conditions of gentle agitation. For calcium silicate of the specified surface area, a stoichiometric excess of calcium chloride is used, generally 5 to 30 percent stoichiometric excess. In intermingling the respective solutions of sodium silicate and alkaline earth metal salt, mixing is expeditiously accomplished under conditions which distribute throughout the reaction medium the respective solutions.

The following example illustrates the preparation of calcium silicate suitable for pelletization and densification by the present invention:

EXAMPLE I

The product was prepared in a one hundred-gallon rubber-lined tank having a one-half inch feed line in a form of a horizontal distributor across the top of the tank for multiple stream addition of the sodium silicate solution. A two-inch diameter product removal line was disposed within the tank at a level representing the 60-gallon point and provided with an external ledge to control the liquid contents of the tank at between 60 to 85 gallons. Calcium chloride solution was fed into the bottom of the tank. Air was passed into the bottom of the reactor, imparting a gentle rolling agitation to the slurry.

Aqueous solutions of the respective reagents containing 100 grams per liter of calcium chloride and 100 grams per liter of $SiO_2$ were introduced into the reactor through their respective feed lines at average speed rates of 2.95 gallons per minute of silicate solution and 1.98 gallons per minute of calcium chloride solution. This approximated a stoichiometric excess of 15 to 20 percent calcium chloride. Slurry precipitated at the rate of about 5 gallons per minute and contained approximately 7.5 percent of solids by weight.

After withdrawing the slurry at the rate corresponding, it was pumped to a three Dorr tank system and washed. After washing, the slurry was filtered on an Oliver Wheel; the resulting filter cake contained 23.6 percent solids by weight. This was dried in a Louisville drier, and then milled to provide a product containing less than 0.1 residue on a 325 mesh screen.

Calcium silicate produced in the above manner had a surface area ranging between 32 and 36 square meters per gram, a pH of 10.5 in aqueous slurry and contained about 0.47 percent sodium chloride by weight. Bound water in the concentration of about 10 percent by weight of the pigment and free water in the range of 3.3 to 5.3 percent were present in the pigment. The calcium silicate had a composition conforming to the formula $$CaO(SiO_2)_{3.1-4.75}$$ 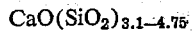

An average composition for the product was $$CaO(SiO_2)_{3.33}$$ 

The bulk density of this pigment was 12 to 14 pounds per cubic foot. By varying the excess calcium chloride, calcium silicates of 20 to 70 square meters per gram may be prepared according to the above example.

The following example demonstrates the manner in which the densification and pelletization may be accomplished:

EXAMPLE II

Pelletization and densification was effected in a 21 inch diameter drum having an overall length of 30 inches. Four wood baffles 27 inches long by 3 inches wide were positioned parallel to the long axis of the drum and spaced 90 degrees apart around its inner surface. These wood baffles insured effective tumbling of the charged material during the rotation of the drum.

Into this drum was charged 50 pounds of powdery, finely divided, pulverulent calcium silicate of 35 square meters per gram surface area prepared according to the procedure outlined in Example I. The free water content of the pigment was 5.2 percent by weight. It had a bulk density of 13.5 pounds per cubic foot. Approximately 65 percent of the volume of the drum was occupied by the fifty-pound charge of pulverulent calcium silicate.

Disposed with its primary axis in horizontal position, the drum was rotated on an Abbe mill at twenty revolutions per minute. Periodically, samples of the drum's content were removed and the bulk density determined. The pellets' strength also were observed.

The following is the data:

Table 1

| Time, minutes: | Bulk density pounds/cu. ft. |
|---|---|
| Start | 13.55 |
| 10 | 15.1 |
| 20 | 15.4 |
| 30 | 15.8 |
| 60 | 16.4 |
| 90 | 16.4 |
| 120 | 18.1 |
| 180 | 20.5 |
| 240 | 21.6 |
| 300 | 21.6 |
| 360 | 22.95 |
| 420 | 23.2 |
| 480 | 23.4 |

After 30 to 60 minutes of rotation within the drum, the pulverulent, powdery, finely divided amorphous calcium silicate was converted into small pellets averaging approximately two millimeters in diameter. These pellets were of high strength; even upon handling and attempted crushing they did not disintegrate appreciably. As the treatment continued, the strength of the pellets increased. The number of pellets in excess of two millimeters in diameter increased with continued tumbling in the drum.

One important characteristic of the original, powdery finely divided, amorphous calcium silicate treated in Example II is the ease with which it is slurried or dispersed in water. Especially in paper pigmentation, this quality has significance. The calcium silicate pellets prepared in Example II evidenced water dispersability comparable to the original unpelletized, undensified material. Moreover, when tested in paper pigmentation, the densified, pelletized calcium silicate proved an effective pigmenting material. The original calcium silicate possesses exceptional paper pigmenting qualities.

Whereas the untreated calcium silicate was exceptionally dusty and even slight shaking raised a cloud of white smoke, the pelletized, densified product was strikingly less dusty. Upon shaking, dusting was almost indiscernible.

EXAMPLE III

Employing the apparatus described in Experiment II except that three baffles were spaced 120 degrees apart on the inside of the drum, finely divided, powdery, amorphous pulverulent calcium silicate of 51 square meters per gram surface area was densified and pelletized. After rolling in the drum for one hour at 15 revolutions per minute, the bulk density of the pigment was 16 pounds per cubic foot; and after two hours of rolling the bulk density was increased to 16.7 pounds per cubic foot; after three hours of rolling the product had a bulk density of 19.9 pounds per cubic foot.

EXAMPLE IV

Following the procedure of Example II and employing the modified pelletizer of Example III, 50 pounds of finely divided, amorphous pulverulent calcium silicate having a surface area of 37 square meters per gram was rolled for approximately 2½ hours. At the conclusion, the product had a bulk density of 26.3 pounds per cubic foot. The pellets so produced averaged about 2 millimeters in diameter. The pellets could be handled in conventional manner without disintegration.

EXAMPLE V

Following the procedure of Example IV, finely divided, amorphous pulverulent calcium silicate of 32 square meters per gram surface area was tumbled in the drum for three hours. The densified, pelletized product had a bulk density of about 20 pounds per cubic foot.

Thus, according to this invention, pellets of alkaline earth metal silicates of from 20 to 70 square meters per gram are provided having bulk densities ranging upwards of 16 or 17 pounds per cubic foot and as high as 26 pounds per cubic foot, or higher, say 30 pounds per cubic foot. These pellets range in size depending upon the extent of the treatment. Usually their average size is between 2 to 4 millimeters; they appear approximately spherical.

Although the present invention has been described with reference to specific details of particular embodiments, it is not intended that the invention be construed as limited thereto except insofar as such limitations are found in the appended claims.

I claim:

1. The method which comprises charging a container with a powdery, pulverulent, previously dried finely divided flocculated amorphous alkaline earth metal silicate containing not in excess of 8 percent free water by weight of from 20 to 70 square meters per gram surface area and a bulk density up to 15 pounds per cubic foot in a quantity sufficient to occupy from 50 to 90 percent of the volume of the container and tumbling the contents of the container whereby to form an alkaline earth metal silicate product of a bulk density in excess of the charged material and comprised of small high strength pellets.

2. The method which comprises charging a container with powdery, pulverulent previously dried finely divided flocculated, amorphous calcium silicate containing not in excess of 8 percent free water by weight of from 20 to 70 square meters per gram surface area and a bulk density up to 15 pounds per cubic foot in a quantity sufficient to occupy upwards of 50 percent but not all of the volume of the container and tumbling the contents of the container whereby to form a calcium silicate product of a bulk density in excess of the charged material and comprised of small high strength pellets.

3. A method which comprises charging a container with powdery, pulverulent, previously dried finely divided, flocculated amorphous calcium silicate containing not in excess of 8 percent free water by weight having a surface area of from 20 to 70 square meters per gram and a bulk density of from 9 to 14 pounds per cubic foot in a quantity sufficient to occupy upwards of 50 percent but not all of the volume of the container and tumbling the contents of the container whereby to form a calcium silicate product of a bulk density in excess of the charged material and comprised of small high strength pellets.

4. A method which comprises charging a container with powdery, pulverulent, dried finely divided, flocculated amorphous calcium silicate containing not in excess of 8 percent free water by weight having a surface area of from 20 to 70 square meters per gram and a bulk density of up to 15 pounds per cubic foot in a quantity sufficient to occupy upwards of 50 percent but not all of the volume of the container and tumbling the contents of the container to form a calcium silicate product having a bulk density in excess of the charged material and comprised of small high strength approximately spherical pellets having their average size between 2 to 4 millimeters, said charged powdery calcium silicate having been milled subsequent to being dried.

References Cited in the file of this patent

UNITED STATES PATENTS

| | | |
|---|---|---|
| Re. 19,750 | Billings et al. | Nov. 12, 1935 |
| 2,204,113 | Allen | June 11, 1940 |
| 2,316,043 | Billings et al. | Apr. 6, 1943 |
| 2,547,127 | Kalousek | Apr. 3, 1951 |
| 2,564,992 | Pechukas | Aug. 21, 1951 |
| 2,679,463 | Alexander et al. | May 25, 1954 |
| 2,848,311 | Greene | Aug. 19, 1958 |

FOREIGN PATENTS

| | | |
|---|---|---|
| 570,856 | Germany | Feb. 22, 1933 |

OTHER REFERENCES

Chem. Engineering, October 1951, pages 161–174.